United States Patent [19]
Leung et al.

[11] Patent Number: 6,005,870
[45] Date of Patent: Dec. 21, 1999

[54] METHOD FOR CALLED PARTY CONTROL OF TELECOMMUNICATIONS NETWORK SERVICES

[75] Inventors: Kin K. Leung, Edison; Gabriel Gary Schlanger, West Orange, both of N.J.

[73] Assignee: AT&T Corp., New York, N.Y.

[21] Appl. No.: 08/695,472

[22] Filed: Aug. 12, 1996

[51] Int. Cl.$^6$ ..................................................... H04M 3/42
[52] U.S. Cl. ........................................... 370/466; 379/201
[58] Field of Search ................................... 379/201, 208, 379/209, 210, 211, 212, 213, 214, 217, 218, 90.01, 93.01, 93.02, 93.03, 93.14, 93.15, 93.18, 93.23, 100.13, 100.01, 100.15, 100.16, 372; 370/252, 352, 401, 466, 467

[56] References Cited

U.S. PATENT DOCUMENTS

| | | | |
|---|---|---|---|
| 3,944,750 | 3/1976 | Sobanski | 379/208 |
| 5,146,488 | 9/1992 | Okada et al. | 379/93.15 |
| 5,239,542 | 8/1993 | Breidenstein et al. | 379/93.15 |
| 5,274,695 | 12/1993 | Green | 379/88 |
| 5,333,266 | 7/1994 | Boaz et al. | 379/93.15 |
| 5,406,557 | 4/1995 | Baudoin | 379/93.15 |
| 5,596,627 | 1/1997 | Solomon | 379/142 |
| 5,602,908 | 2/1997 | Fan | 379/142 |
| 5,625,680 | 4/1997 | Foladare et al. | 379/127 |

*Primary Examiner*—Huy D. Vu
*Attorney, Agent, or Firm*—Banner & Witcoff, Ltd.

[57] ABSTRACT

A method for providing called party control of telecommunications network services utilizes a call treatment processor having an associated calling party data memory for storing calling party identification data and a call treatment table. Depending on the time of day, day of week and data input by a user of the apparatus, elements of the serving apparatus including one of media conversion and network conversion apparatus are automatically controlled by the call treatment processor to provide telecommunications network services to the calling party as predetermined by the called party. According to the principles of the method of the present invention, at least some calling party identification data is prestored by the called party user of the present invention such as personal identification code, is obtained via the call treatment processor of the present invention at the time of an incoming call such as via automatic number identification, analyzed in view of a predetermined call treatment table having a plurality of priority call treatment levels and a call treatment actuated that is related to the called party's predetermined call treatment stored in the table. For example, a call from the called party's home telephone number, identified by PIN as the called party's spouse and further identified by a predetermined emergency code may have the highest priority level call treatment.

44 Claims, 10 Drawing Sheets

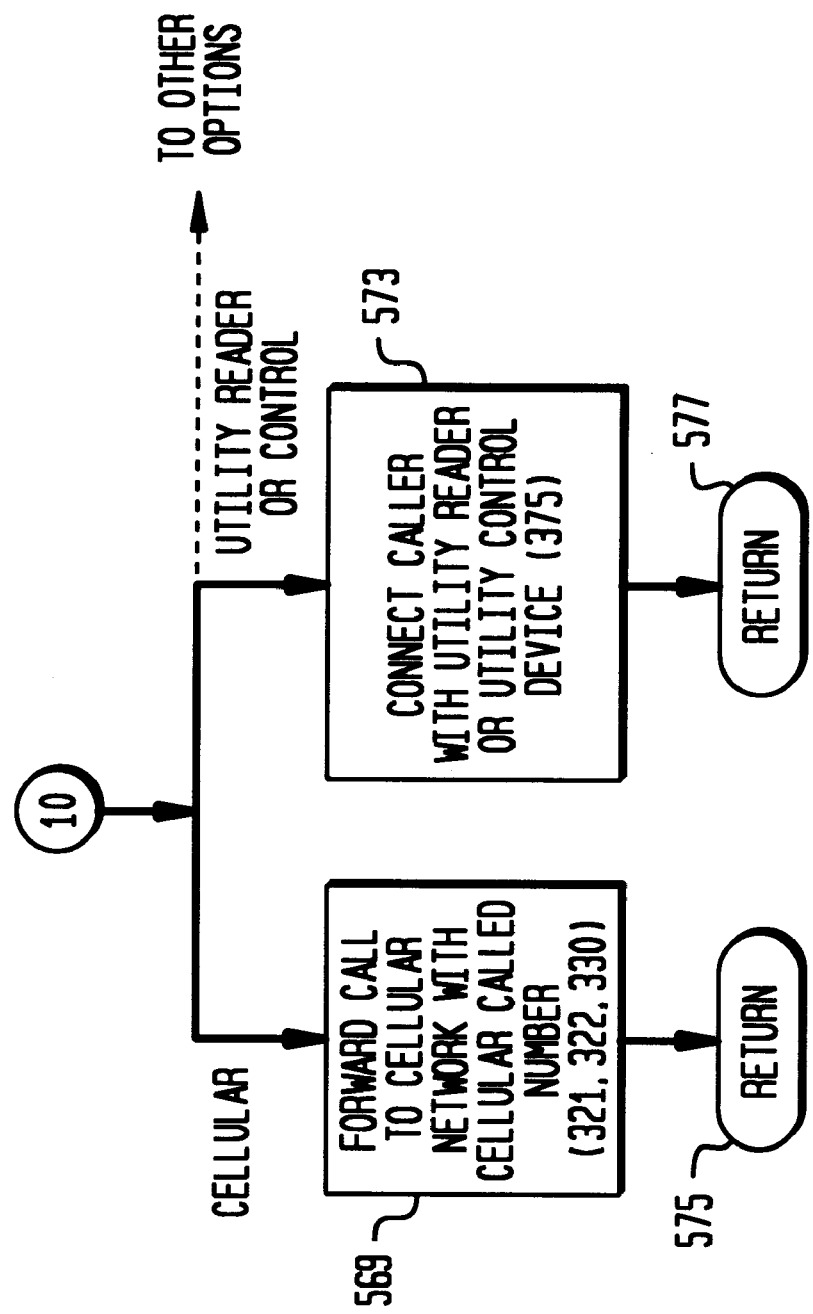

6,005,870

METHOD FOR CALLED PARTY CONTROL OF TELECOMMUNICATIONS NETWORK SERVICES

BACKGROUND OF THE INVENTION

1. Technical Field

This invention relates to the telecommunications field and, more particularly to the field of providing called party control of telecommunications network services including store and forward messaging, media conversion, network conversion, home management and personal telecommunications routing services.

2. Description of the Relevant Art

Telecommunications equipment manufacturers and service providers have begun to provide new services and features for their customers and subscribers never before contemplated. As the availability of such services and features has increased, so has the opportunity for unwanted manual and even automatic calls to the subscriber, "junk" calls advertising unwanted products and services and delivery of unwanted or unneeded facsimile copies, junk E-Mail, junk voice-mail and the like. Also, it has become desirable to prioritize wanted calls, such as emergency calls. As a result, called party control of incoming calls has emerged. Called parties can now control, for example, via call screening, calling party identification and the like the calls that they choose to take or even refuse to take. Call screening, for one, permits the called party to identify the telephone numbers of parties from whom the called party is willing to accept calls. The customer premises equipment or local switch receiving a call compares the telephone number of the calling party identified through calling party number identification, frequently referred to as automatic number identification, with the stored telephone numbers the called party has entered into memory. Only the calling parties identified on the stored memory list may be permitted to connect to the called party. Also, if the calling party is not on the stored memory list, the call is blocked or other action taken such as voicemail. Moreover, through caller identification, a called party may see the telephone number of the calling party and, recognizing or not recognizing the displayed telephone number immediately make a decision as to whether they wish to take the call.

Called parties may own or lease private telecommunications apparatus permitting such called party control or obtain called party control services from their local or long distance carrier. Such apparatus is typically provided with a computer data processor and computer software for controlling the routing and treatment of an incoming call. At the customer's premises, such equipment may take the form of a telephone set, linked station apparatus or at a small or large business, it may take the form of a private branch exchange (PBX).

In the telecommunications network, serving central offices are classified as to their immediate or more remote (long distance) access to the subscriber. There exist five classes of offices from the end office most proximate to the subscriber to the regional toll office, the most remote. All offices besides the end office may be categorized as toll offices since they connect parties typically removed from one another to the extent that the subscriber must pay a premium for the call.

Recently, there has been considerable discussion and activity regarding the avoidance of the toll network comprising toll offices and connecting long distance facilities. With personal computers and access to the so-called Internet, subscribers are today free to communicate, at least via a data link, with subscribers all over the world.

Other networks exist outside the toll and local public switched telephone networks besides the Internet. For example, cellular networks allow subscribers to be reached in their cars, even as they walk down the street via vest pocket phones. Paging systems provide messaging access to a subscriber who is not equipped with a wireless or wired telephone. Consequently, there is a need in regard to local and toll networks for providing access to Internet and cellular networks It is customary now for a subscriber to have a telephone number at work, an E-Mail address at their computer, a cellular or mobile telephone number, a pager number and a telephone number at home, etc. It is said that cellular growth has created a great need for new area codes to cover the growing demand for new telephone numbers (for the same customers at work, on the move or at home). Thus, there has been created a great need for harmonization of the several services and interfaces among networks. It would be desirable if a subscriber has one telephone number, wherever they are located, and called party control of all such new services so that the called party may be given the freedom to accept or reject incoming calls no matter what media is presently available to them.

As a result of these recent developments, new services are evolving to deal with the new complexities of the telecommunication arts; for example, store and forward messaging provides an opportunity that, when a subscriber is presently unavailable, a message, fax or the like may be recorded and forwarded upon request to a subscriber.

An example of a service under development is media conversion. The facsimile may require conversion to voice or to image data for display. The voice or data may require conversion to data for display on a pager. Network conversion suggests that a telephone call requires conversion to a paging network or a telephone network call to a cellular network call or an internet call to a voice call or a cable television network call to a public telephone network call, all permutations and combinations of these provided by way of example only and others and vice versa. Personal Reach (TM) service available from AT&T permits the calling party to personally reach the called party, in a 2-way telephone conversation, if the called party so chooses.

In the home management art and from banking and credit card use, it is common for an individual to have a personal identification number or PIN uniquely defining the individual. When an individual enters their credit card or bank account number at an automatic teller machine, the individual must also enter their PIN for security purposes. By home management as used herein is intended the management of one's personal or home life. By way of example, utility, banking, burglar alarm, lights, appliance control and the like can be managed remotely, i.e. from a remote location over the telecommunications network. Yet, there is a need in the art to assure security in any transaction, including business and personal home management transactions.

In the private branch exchange art, Arbel et al., U.S. Pat. No. 5,276,731, provide a method and apparatus for handling incoming telephone calls to a business exchange whereby the called party may control the screening or routing of incoming calls over time. Predetermined messages may be delivered to predetermined calling parties; incoming calls may be screened on a priority level basis; and incoming calls may be rerouted on the basis of predetermined selection criteria. For example, a doctor taking a vacation may set up a predetermined rerouting of their patients to three doctors handling the vacationing doctor's calls. A shift foreman can schedule incoming calls to other foremen depending on time of day. In one embodiment, calling parties may be instructed to enter a Personal Identification Number (PIN) before the call will be connected. According to U.S. Pat. Nos. 5,497, 414 and 5,506,887, there also exist called party control at the network level for control of call routing. A so-called advanced intelligent network (AIN) wireline system connects to and controls processing of calls to a personal communication service subscriber's wireless handset via a home base station or a wireless communication network. For example, in response to incoming calls to the subscriber, if predetermined, the AIN accesses a home location register to determine the current location where the subscriber's handset is located. The AIN can then use that data to route the calls to the subscriber at the preregistered new location. Determination of call processing is thus made as a network feature rather than as a switch feature.

Despite these advances in the telecommunication arts, there remains a need to provide further enhancements to provide called party control of new services including but not limited to store and forward messaging, media conversion, network conversion, home management and so-called Personal Reach or related personal telecommunications routing services.

SUMMARY OF THE INVENTION

According to the principles of the present invention, the called party is provided control of incoming calls and, most importantly, over new services including but not limited to store and forward messaging, media conversion, network conversion, home management and so-called Personal Reach or related personal telecommunications routing service. Moreover, the present invention may be provided in a customer premises equipment or a local or toll network setting. It is not limited to implementation in the form of control apparatus for a private branch exchange. Also, the called party does not have to physically participate in the real time decision making.

According to a first principle of the present invention, all possible information about the calling party that can be obtained is obtained. The identity of the calling party as to individual or limited group is determined based on explicitly requesting a personal identification code (individual) or a more generally available access code (limited group). According to a further embodiment of the present invention, an emergency code may be further requested in the event of an urgent need by the calling party to speak with the called party. Moreover, through automatic number identification facilities and the like, the calling party's originating telephone number may be determined. In Internet services, the E-Mail address is determined from data in the forwarded connecting data call. Also, the called party controls services by entering into memory a complete listing of expected calling party information and personal schedule of availability to receive calls.

According to the second principle of the present invention, a treatment table is provided that is calling party identity dependent. The service point, customer premises equipment, E-Mail host, end office or toll office applies different predetermined services for one of terminating, completing or otherwise serving the calling party as specified in the treatment table in advance by the called party. For example, an incoming call may be forwarded to, for example, Personal Reach service or a related personal telecommunications routing service where the called party is paged and allowed to decide in real time whether to connect to a bridge or link to the caller or to allow at least voicemail/fax-mail treatment.

Finally, according to the last principle of the present invention, the service point is provided with the capability and the predetermined control software to apply all the different routing or screening or other treatments as defined in the treatment table and according to predetermined priority. Moreover, the various actions may be predetermined by time of day and day of week so that, even outside of the normal business day, the present invention may be applied to advantage.

These and other features of the present invention will be best understood from studying the drawings of the present method for called party control and suggested apparatus for implementing the method showing exemplary block schematic diagrams of network switch equipment and customer premises equipment and flowcharts for providing service via either form of equipment. The present invention should not be construed to be limited to the claimed method or the depicted suggested embodiments as the principles may be further applied in an Internet environment or a non-telecommunications network environment as well.

BRIEF DESCRIPTION OF THE DRAWINGS

FIGS. 2 and 3 relate to providing the method and apparatus of the present invention, by way of example, at a network switch, an end office or toll office.

FIG. 3 is a block schematic diagram of network switch apparatus for providing the features and method of the present invention; reference numbers provided for defining elements of the switch are referred to in the call processing flowchart of FIG. 4.

FIG. 4 comprises three figures of call processing flowcharts for implementation via the network switch apparatus of FIG. 3; reference numerals included within boxes of the flowchart refer to elements of the apparatus of FIG. 3.

FIG. 4A represents the initial progress of the incoming call while FIGS. 4B and 4C represent further stages; reference numerals in circles indicate connecting points between boxes of the several flowcharts.

FIG. 5 is a block schematic diagram of customer premises equipment, station equipment or private branch exchange equipment for providing the features of the present invention; reference numerals provided for defining elements of the equipment are referred to in the call processing flowchart of FIG. 6.

FIG. 6 comprises three figures of call processing flowcharts for implementation via the customer premises equipment of FIG. 5; reference numerals included within the boxes of the flowchart refer to elements of the customer premises equipment of FIG. 5.

DETAILED DESCRIPTION OF THE INVENTION

There exist three guiding principles of the method of the present invention for providing called party control of telecommunications network services. First, referring to FIG. 1, there is a principle that any apparatus for accomplishing the claimed method may store according to the called party's input and determine during the incoming call as much information as possible about the calling party. On the other hand, the called party may store minimal information about the calling party, as will be further described herein, such as a PIN for an individual or an access code for a group, an emergency code for high priority calls or the telephone number for the calling party.

Figure 1:
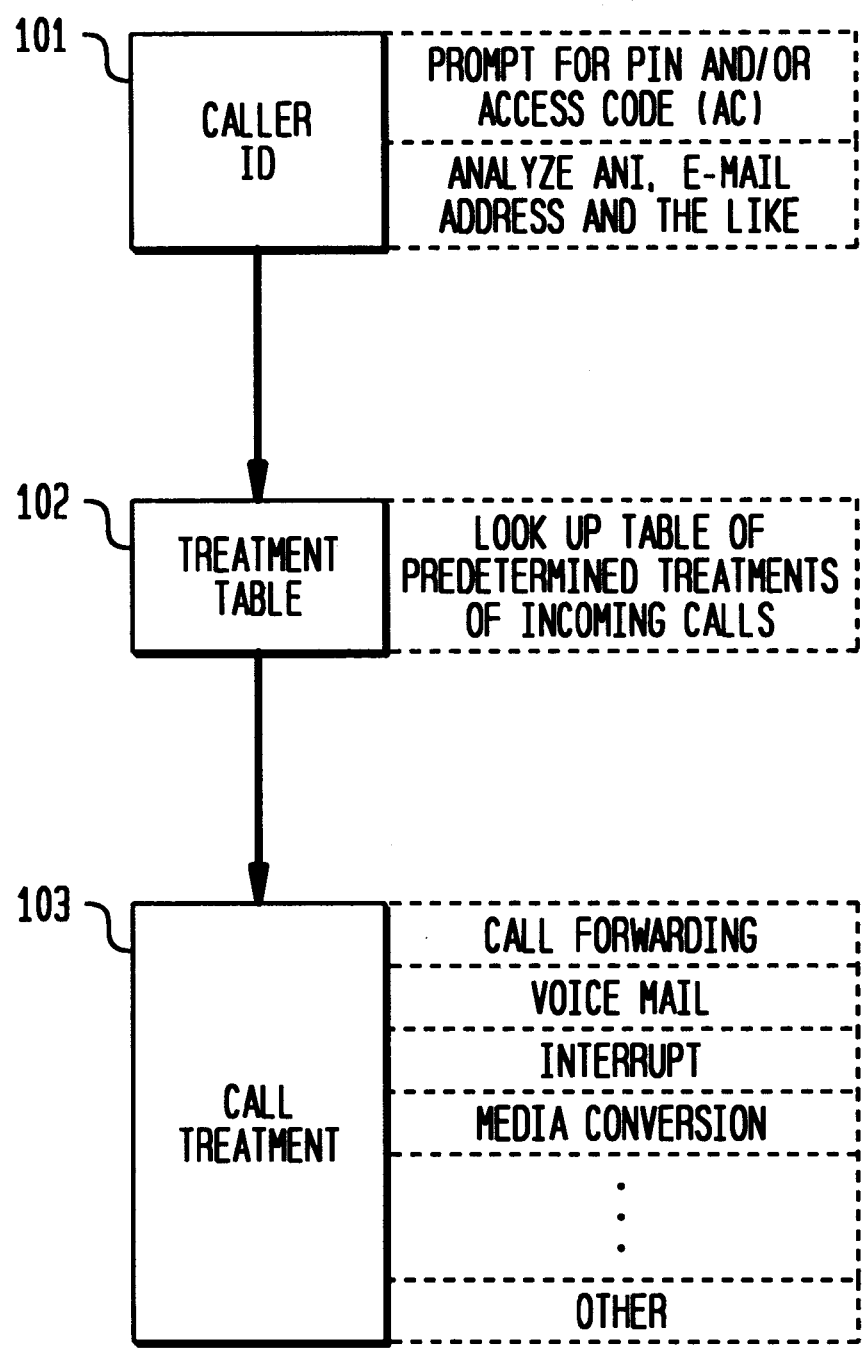
FIG. 1 is an overall flowchart for describing the three principles of the method and apparatus of the present invention for providing called party control of telecommunications network services.

Referring to the flowchart of FIG. 1, caller ID box 101 represents this first principle. The called party customer or subscriber to the present invention may enter into memory of serving apparatus as much information as the called party knows about a calling party for determining their identity or as little information as is required to assure the call is routed properly. The called party subscriber to a service or customer purchaser of customer premises apparatus may be provided with a terminal screen, be prompted for voice input, upload from their personal computer to serving apparatus or otherwise input one or more of the following parameters: input calling party name, telephone number, cellular number, paging number, extension, access code, sometimes referred to herein as an AC (representing a limited group of calling parties), personal identity number, sometimes referred to herein as a PIN (representing an individual known to the calling party), emergency code, sometimes referred to herein as an EC, E-Mail address (in the event the call originates via the Internet), spoken name, social security number and the like. Again, some or all of this information may be input for a given calling party at the called party's choice. Other information regarding the calling party may be generated locally or remotely and added to the stored data about the calling party, for example, the called party's name can be looked up in a directory and their telephone number be determined. Still other information may be prompted for entry by the user.

Also, once all the information is input, a calling party may be prompted during an incoming call for their PIN, their group access code, an emergency code or other identifying indicia. Other calling party information is automatically determined via directory look-up or other methods such as what is generally referred to as automatic number identification apparatus for identifying public switched telephone network (PSTN) number, private network tie line identification, trunk identification, wide area telephone service number, extension number, E-Mail address, cellular number, extension number, trunk identifier or other incoming calling party identification.

Further according to block 101, the calling party identification data is analyzed including but not limited to ANI data, PIN, Access Code or other called party input identification data by comparison with that offered by the calling party or automatically determined by the serving apparatus. As a result of the analysis, the data can be at least determined whether it reaches a certain priority with the called party. For example, if the calling party identification data cannot be found at all, the calling party may be automatically judged to have a low priority according to the method of the present invention. On the other hand, the highest priority may be obtained if the personal identification code for one's spouse is entered and the call is received from one's home telephone number from automatic number identification and an emergency code is entered as well so that it may be reasonably assumed that the call is high priority.

Clients, friends and the like may be provided with an access code or different access codes identifying different classes of what may be assumed according to the present method to be medium priority calls. Moreover, in one embodiment of the present invention, there may be further provided an emergency code that, for example, a called party's immediate family member may further enter to indicate an extreme emergency condition of the highest priority (represented by home telephone, family AC and emergency code (EC)).

Now it is a second principle of the present invention according to box 102 of the flowchart of FIG. 1 that a treatment table be provided that may provide different treatment depending on time of day, day of week and the like as will be further described herein. For each and every combination and permutation of available calling party identification data there may be a call treatment specified by the called party that varies by time of day and day of week. Moreover, the called party may change their schedule and call treatment table at any time by dial-up or dial-in or otherwise input to customer premises equipment or network switch apparatus or other serving equipment. Moreover, it could be updated via an upload from their personal computer.

Finally, apparatus for providing service according to the present invention comprises certain predetermined elements for basic service such that each and every call treatment may be accommodated that is provided in the call treatment table 102. According to call treatment apparatus 103, a call may be forwarded, may have a voice or fax message stored in mail, may be interrupted, may be converted from one media form to another such as facsimile to voice, voice to facsimile, voice to image data and the like or other call treatment. Typically, treatment apparatus may be in the form of plug-in hardware and/or require software update so that such apparatus may be readily adapted to new call treatments as they become available.

Figure 2:
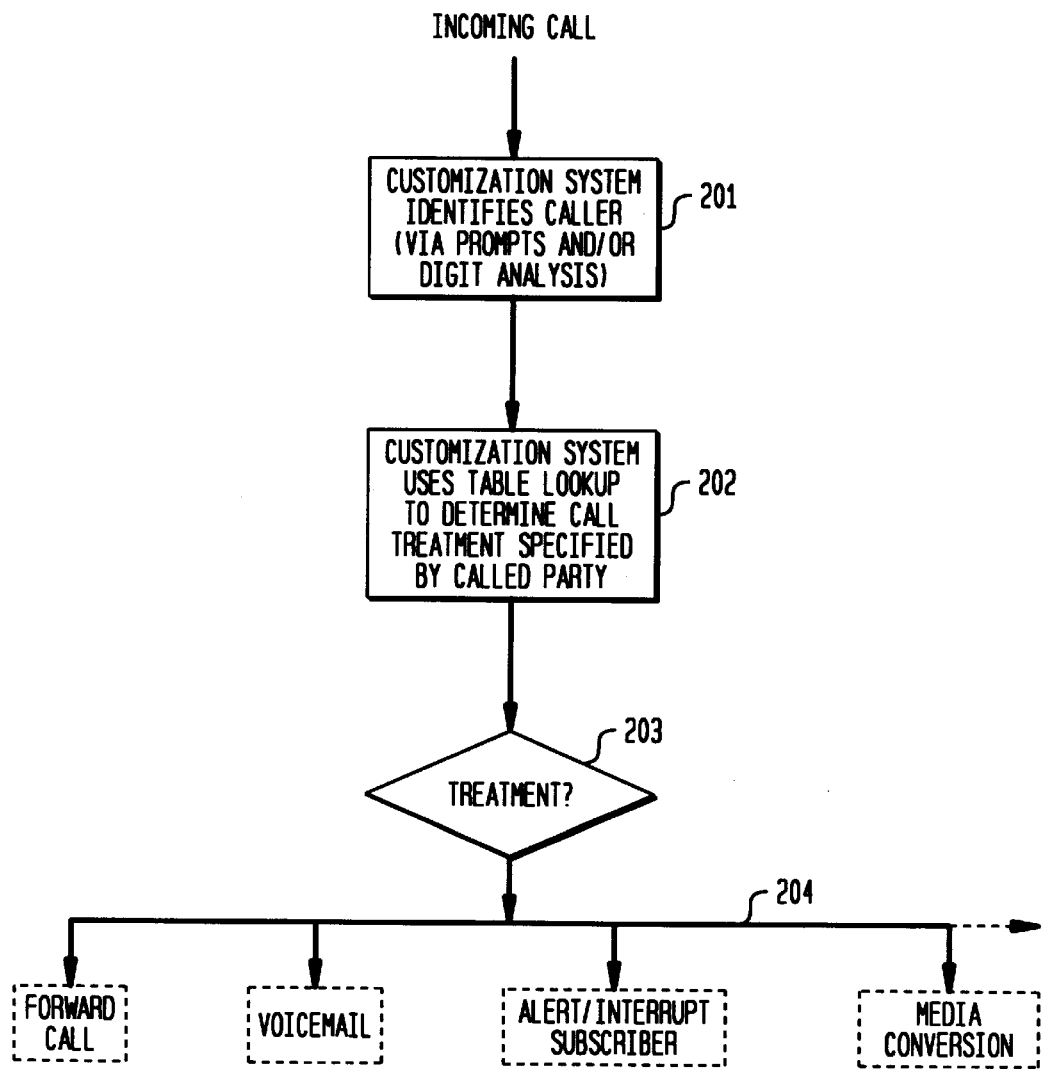
FIG. 2 extends the overall flowchart of FIG. 1 to provide a high level call processing flowchart for an incoming call from a calling party in any environment to a called party.

Now referring to FIG. 2, the flowchart of FIG. 1 and the three principles of the present invention will be further described by means of a high level call processing flow chart. An incoming call is placed and received at serving apparatus. At box 201, serving apparatus comprises a customization system that permits input of calling party identification by the called party customer or subscriber or otherwise input as already described above. (For example, the called party may load calling party identification data via their terminal, via voice communication, via personal computer upload or the like). The customization system identifies the caller via voice or data prompts and/or received digital data analysis. As indicated above, the digital data analysis by calling party identification apparatus may comprise cellular telephone number, extension number, E-Mail address, trunk identification data, facsimile machine number, directory look-up or other identifying data that can be automatically determined by the serving apparatus. Also, preferably, time of day and date are maintained for the subscriber to the present service or owner of the serving apparatus so that any call treatment table that is formed may be dated, updated, forwarded to other serving equipment as necessary and actions generally taken in accordance with a computer program and predetermined input schedule as will be further described below.

According to box 202, the customization system of the present invention uses a table look-up, referred to herein as a treatment table to determine call treatment specified by the called party for each and every combination of calling party identification data and by time of day and day of week. Consequently, the serving apparatus typically comprises an automatic and accurate time-of-day and day of week calendar software algorithm or hardware circuit including a clock for determining call treatment, time stamping any stored messages and the like.

At box 203 the question is asked what is the call treatment specified by the treatment table? Depending on the answer, actions and services according to alternative paths 204 may be initiated. For example, the call may be forwarded, the caller's message may be stored in voice or fax mail or other mail service, the subscriber or customer may be alerted or interrupted because of a high priority call, the initial media form may be converted, for example, from voice to fax, from voice to image, and so on. The dashed lines at the right represent that other services may be provided (and plug-in apparatus and/or software updates provided to serving apparatus) that are not already identified in the brief call treatment alternative table 204 depicted in FIG. 2.

Figure 3:
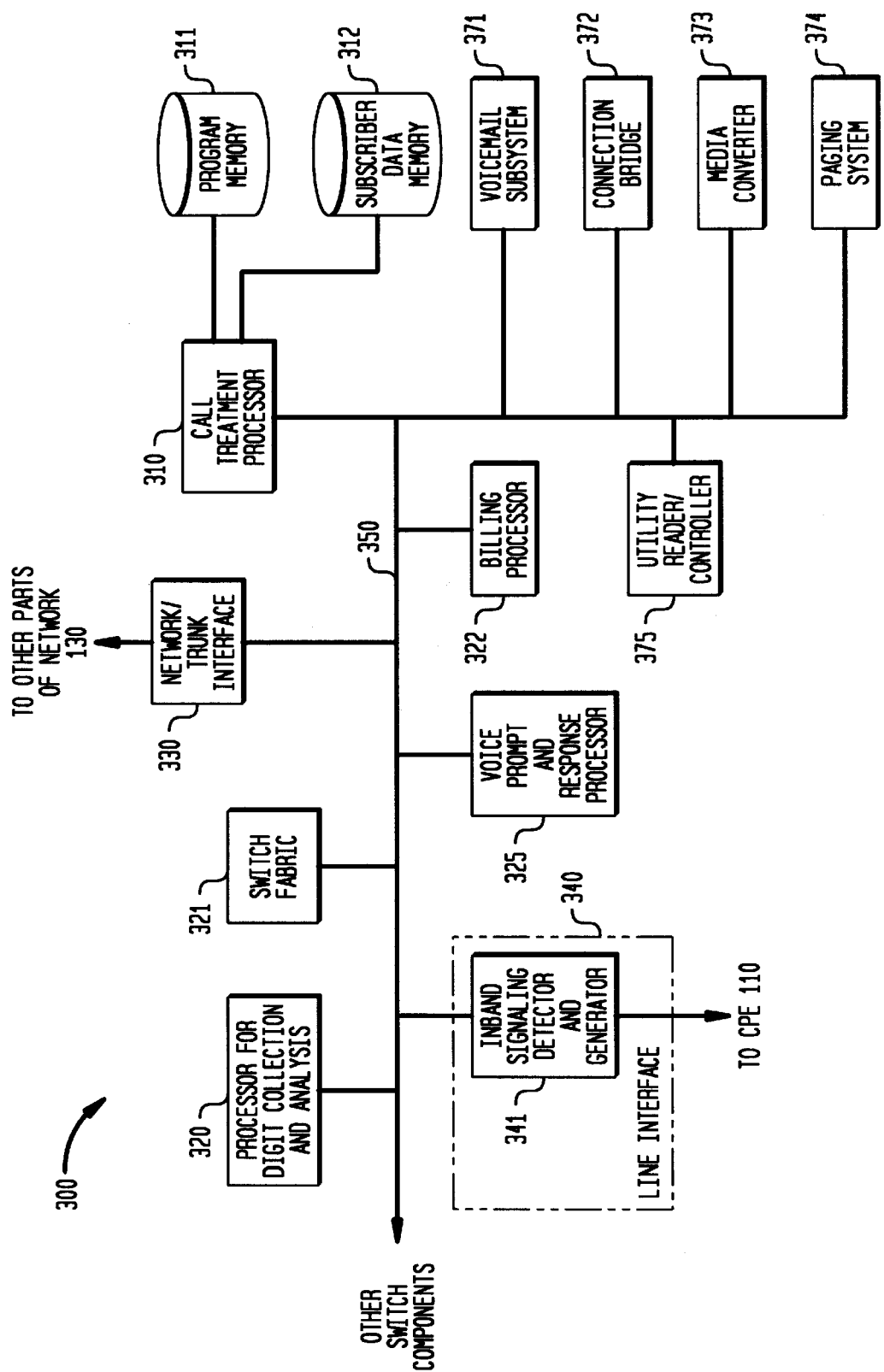

Now a network switch embodiment of the present invention will be described in the context of the block schematic diagram of FIG. 3 while a detailed call processing flowchart for the exemplary serving apparatus of FIG. 3 is provided in FIG. 4. Adaptation of this apparatus for implementation in subsequently described customer premises apparatus of FIG. 5 or other serving apparatus such as personal computer terminal, cable television terminal and the like may become apparent from the following description of exemplary embodiments. In accordance with FIG. 3, a switch may be an end office or toll office comprising a common controlled processor and various elements as depicted. Such switches may be available from Lucent Technologies, Northern Telecom or other manufacturers known in the art. Switch 300 typically comprises, according to the principles of the present invention, a network or trunk interface 330 to other parts of a local or toll network 130. The arrow represents a communications link which may be wired or wireless, land-based or satellite. The network/trunk interface 330 is coupled to other elements of network switch 300 by communications bus 350 which, may be wired or wireless or comprise a fiber optic link. Coupled to bus 350 are: a processor 320 for digital data collection and analysis, a switch fabric (the actual switch) 321 for accomplishing connections, a call treatment processor 310 having associated program memory 311 and subscriber data memory 312, a billing processor for subscriber billing responsibilities 322, a voice prompt and response processor 325, an inband signaling detector and generator 341 comprising a portion of a line interface 340, a voicemail subsystem 371, a connection bridge 372, a media converter 373, a paging system 374, a home management (by way of example, utility reader/controller) controller 375 and other switch components identified at the left of the drawing as connected to bus 350.

Line interface 340 provides an interface to station apparatus or customer premises equipment or other line to which the called party is connected. In band signaling detector and generator 341 is necessary for receiving and detecting as well as generating in band signals, typically used for transmitting and receiving commands and data to and from the called party. By in band is intended signals traveling in the telephone channel bandwidth such as ringing, dual tone addressing, dial tone and other signals. Applications of the generator 341 include dial tone, busy signal, ringing, dial and other signals known in the art Application of the detector is typically limited to dual tone, multi-frequency (DTMF).

Typically, digit collection and analysis processor 320 comprises a dual tone, multi-frequency (DTMF) receiver, trunk MF receiver (for receiving local and toll address signals) and processor for receiving dial and trunk initiated signals comprising two tones. In another embodiment, input may be obtained via speech analysis, touch screen, more sophisticated keypad or other input means. Its purpose is typically to receive data input from calling party, called party or any system to which they are coupled which can provide input and forward the decoded result to call treatment processor 310 for further processing.

Voice prompt and response processor 325, in response to call treatment processor 310 and in concert with digit collection and analysis processor 320 requests (prompts) and receives input from typically called and calling party. In one embodiment, it may be assumed that a response is forwarded to processor 325 from 320, in another, it may be assumed that processor 325 will accept and process a voice response. Speech synthesized feedback may be provided a user to assure correct input.

Billing processor 322 is needed for the purposes of billing for network services rendered. The service of the present invention may be implemented on a pay per use basis, a monthly tariff or other billing method known in the art.

Elements 371–375 comprise service circuits or modules typically that are called in to play by call treatment processor 310. Voicemail subsystem 371 has the capability to receive and store messages, play said messages on command or forward messages to a remote location. It should not be construed to be limited to voice as fax, converted media or other messages may be stored, retrieved or forwarded as appropriate. Connection bridge 372 bridges a connection between a calling party and called party or several calling/called parties and so may be a conference bridge or other bridge for linking and providing transmission quality to an incoming call. Media converter 373 is assumed to have the capability of converting one media form to another, fax to voice to image to alphanumeric display to whatever form of media is needed in a particular incoming call. Paging system 374 is assumed to permit the receipt of call control data including signaling data as well as telecommunications voice/data/fax/E-mail from an incoming caller to be forwarded via a paging service to the called party so that eventually the called party can communicate with the calling party. Finally, home management controller 375 is described by way of example as a utility reader/controller 375. According to the present invention, the user of the invention may communicate with the controller 375 from a remote destination for managing apparatus at his personal residence such as obtaining a utility reading, controlling his energy system, setting a burglar alarm, etc. The application of such a home management device is known and its value is enhanced by the application of the present invention to permit secure remote access. The controller 375 is not necessarily on the premises of the user but may be remotely located at switch 300 and so is less easily accessed than if it is entirely on premises.

Controller 375 generally receives signals from the owner of a residence but may receive signals from approved entities such as energy service, alarm service and other vendors. Controller 375 typically has a plurality of associated actuators for specific purposes which are addressably controlled to perform a desired function such as to turn a thermostat down during a winter vacation to save energy. In the subsequent discussion of customer premises equipment, related controller 475 is more likely on premises rather than off-premises.

Figure 4A:
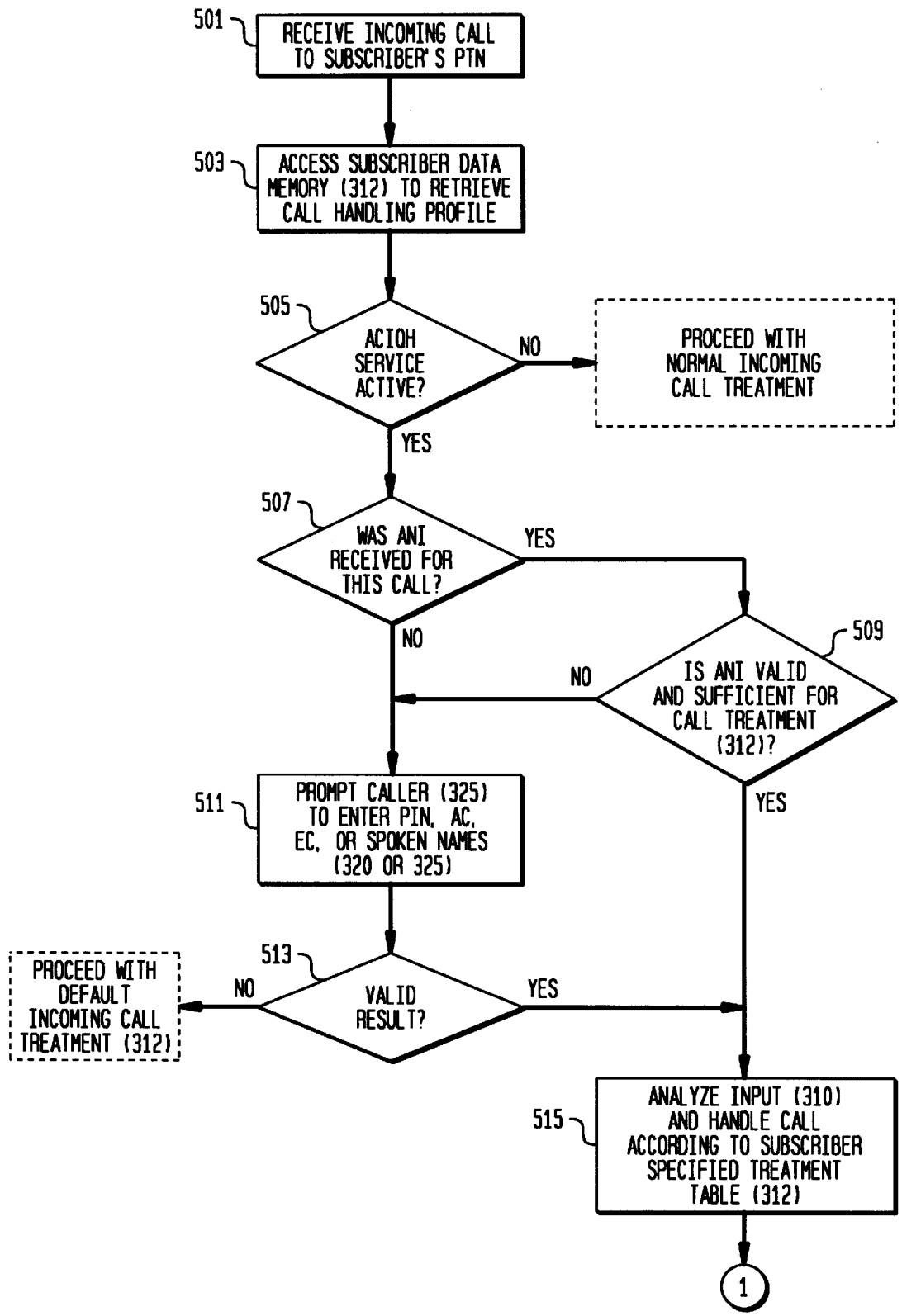

Referring now to FIG. 4A, a call processing algorithm applied at switch 300 will be described with reference to the flowchart. At step 501, the switch 300 receives an incoming call to the subscriber's personal telephone number (PTN). At step 503, the call treatment processor 310 accesses subscriber data memory 312 to retrieve a call treatment profile for the subscriber to the service of the present invention. At step 505, the automated, customized, incoming query handler (ACIQH) of the present invention determines if ACIQH service is active (did he pay his bill?). If yes, then box 507 is entered, otherwise the incoming call is terminated at the location associated with the called telephone number (normal call treatment) by ringing that phone.

At box 507, the processor 310 asks: Was ANI received for this call? If so, box 509 is entered and if not, the caller is prompted to enter their PIN or AC or emergency code or all three via processor 320 and/or 325. If the ANI value is valid and sufficient for call treatment by checking subscriber memory 312 (that is, has the called party entered this number as one of his expected callers) at box 509, box 515 is entered. Otherwise, box 511 is entered and the user is further prompted to enter their PIN, their AC, their EC, spoken data entry such as name or other prompt if the already entered information could be supplemented by further information to achieve a minimum degree of sufficiency to avoid lowest priority (junkmail) treatment or to achieve a higher priority treatment.

In other words, a calling party may forget their PIN but be able to enter other indicia of identity or take other actions to boost their priority with the called party through the call treatment table. If the serving apparatus is sophisticated enough, characteristics of the caller such as their voice, social security number entry or other data may be entered to boost the priority the caller may achieve. The voice or image (if video conference) could be analyzed through voice/image analysis to verify male versus female or even calling party identity.

At box 513, the PIN, AC or EC entry is checked in memory 312 for validity in the same manner as the ANI was. If so, now, the combination of entries is analyzed at box 515. If the result is not valid at box 513, the call treatment processor 310 should proceed with a default incoming call treatment as predetermined by the called party in the treatment table of memory 312.

Now the input received at box 515 may comprise one or more of the ANI data, E-Mail address, PIN, AC or EC. At box 515, the call is handled according to the treatment table 312. For example, a business associate may have an AC, a business line that has been recorded in the treatment table and no emergency code. His access code may be a medium priority group code that in connection with the business line determined by ANI shows in the call treatment table that if the hours are between 8:00 AM and 6:00 PM connect the call to the called party subscriber at his business phone. Further call processing is signaled by the numeral 1 in a circle serving as a connector to the top of FIG. 4B.

Figure 4B:
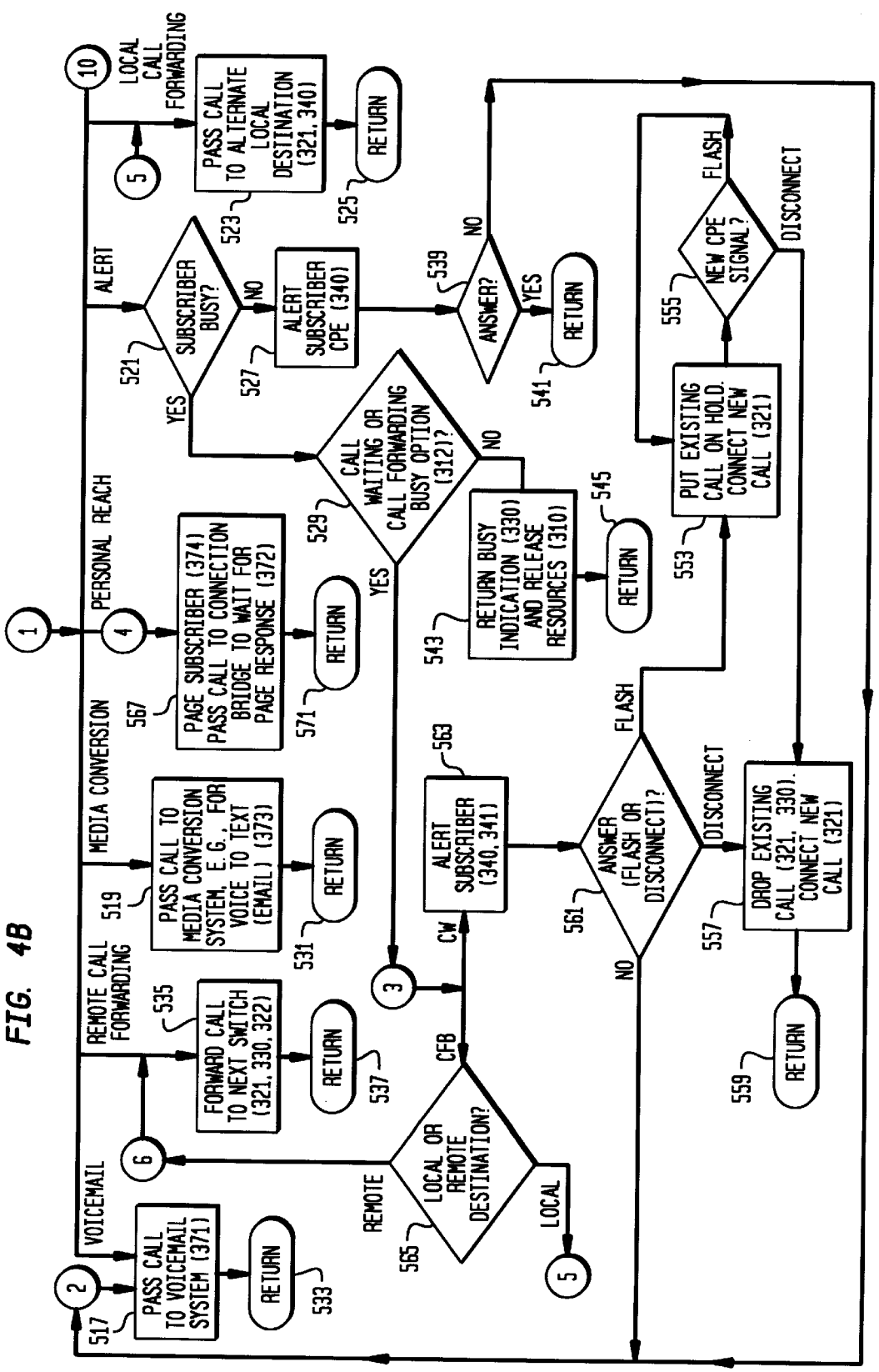

Referring now to FIG. 4B, it should be clear from the previous discussion that any one of a number of alternative courses of action may be taken from box 515 of FIG. 4A: voicemail (517), remote call forwarding (535), media conversion (519), personal telecommunications routing or personal reach indicated by a 4 in a circle, alert (521, 527), local call forwarding (523) and the numeral 10 in the circle is a connector to FIG. 4C. Briefly referring to FIG. 4C, cellular and utility reader or control are indicated as well as other options indicated by the dashed line.

Returning to FIG. 4B, beginning at the left, box 515 of FIG. 4A may indicate that the action to be taken is to pass the call to voicemail system 371. This may be the lowest priority action taken by the call treatment processor 310. At box 533, "return" indicates a return to standby status of processor 310. A higher priority may be to undertake remote call forwarding, represented by box 535. Devices used to provide such remote call forwarding include switch 321, interface 330 and billing processor 322 (to record and/or charge for the remote call forwarding). Box 537 represents "return" to standby status.

Another higher priority activity is media conversion represented by box 519. Here, voice may be converted to text, for example, to be able to convert the voice to an E-Mail message. Return 531 signals return to standby by processor 310. Of course, by media conversion, this invention should not be considered limited in this regard. Other examples of media conversion are practically limitless: fax to image, image to text, text to voice synthesis, etc. In a television conference, the media conversion may involve separating the voice signal from a video signal such as an MPEG compressed video, NTSC video or other video signal known in the art and converting it to text as one example of a possible complex usage of such a device 373. In some instances, it may be appropriate to translate from a first voice language to a second as in an international call; also, the voice may be converted to text and stored to form a transcript of the conversation.

Although not depicted in the drawing, media conversion does not presuppose that the original media version is not stored and saved. To the contrary, while the treatment table may require the forwarding of converted media to the called party, the original media form may be stored for future use by the called party. The original media form may be converted to more than one alternate media form depending on the treatment table. Moreover, while the drawing may suggest that the call stops with media conversion, the treatment table may dictate other activity not shown such as voice or fax mail storage and forwarding, transmittal to the called party of the converted media by other means than a standard PSTN telephone call (such as E-Mail or paging or cellular or other form of call).

Personal Reach (TM) service is another high priority service and, while it comprises a specific service available through AT&T, the boxes of the flowchart describing this service should be generally considered as describing personal telecommunications routing services. The numeral 4 in a circle is a connector to FIG. 4C. Referring to the top of FIG. 4C, it is briefly explained how such services operate by way of example. The subscriber (called party) is paged via paging system 374. Then, the call is passed to connection bridge 372 for a so-called meet-me call or conference. Once a response is received from the subscriber, the bridge actuates a connection (that may require dial-up of the calling party) of calling party to called party. Thus, a page can be converted to a voice connection. Likewise, a page may be converted to a facsimile connection, a personal computer connection, a video conference connection or other connection in accordance with other examples.

"Alert" is initiated at box 521 by determining whether the subscriber (called party) is presently busy. If not, then, customer premsises equipment (CPE) is alerted at box 527 via line interface 340. The called party receives ringing and the calling party hears an audible ring. If the called party does not answer at box 539, box 517 is actuated and a voice or fax mail message taken via mail system 371. If the called party answers, then call processing control returns to the main program at box 541.

On the other hand, if at box 521 the subscriber is busy, box 529 is entered. Depending on the call treatment table, either call waiting or call forwarding is initiated per memory 312. Following call forwarding busy (CFB), at box 565, the destination may be either local or remote (toll). If local, box 523 is entered. The call is passed to the alternate call destination via switch 321 or the local interface 340 (if the call forward number is reachable in the same office).

If the call is remote, the call is forwarded to the next switch via box 535 using switch 321, network interface 330 and billing processor 322 to bill for the toll call or remote forwarding service or both.

If call waiting (CW) is predetermined by the call treatment table, then, at box 563, then the subscriber is alerted using the call waiting signal via interface 340. Eventually, the called party should answer at box 561, but if not, then a message is taken via voice mail at box 517. If the customer is flashed, the calling party is placed on hold at box 553, flashed again at box 555. Or if disconnect during any of this, the existing call is dropped and the new call connected so the calling party can reach the called party at box 557.

Local call forwarding has already been described in some detail as an ultimate call destination. If the call treatment table dictates, a call may be automatically passed to an alternate local call destination via switch 321 and/or line interface 340.

Two more alternative call treatments are described by FIG. 4C, bottom. A cellular network call may be initiated from the PSTN call by forwarding the call to a cellular network at box 569. Switch 321 actuates a connection with the cellular switch and cellular network via trunk interface 330 and the call billed at billing processor 322.

Another possible call treatment is home management indicated by way of example as utility reader or control. A utility may gain access to a home controller to determine the current utility reading without subsccriber intervention. The utility, for example, may be required to enter their access code to reach a home controller. In keeping with this same home managment feature, a subscriber may control their burglar alarm system, regulate appliances and the like by entry of their PIN or access code. The utility device 375 is preferably a home controller that, upon proper input, permits the subscriber to control their home from a remote location.

Other call treatments are possible and these are reflected by the indicia "To Other Options" at the right of the FIG. 4C, bottom.

Figure 5:
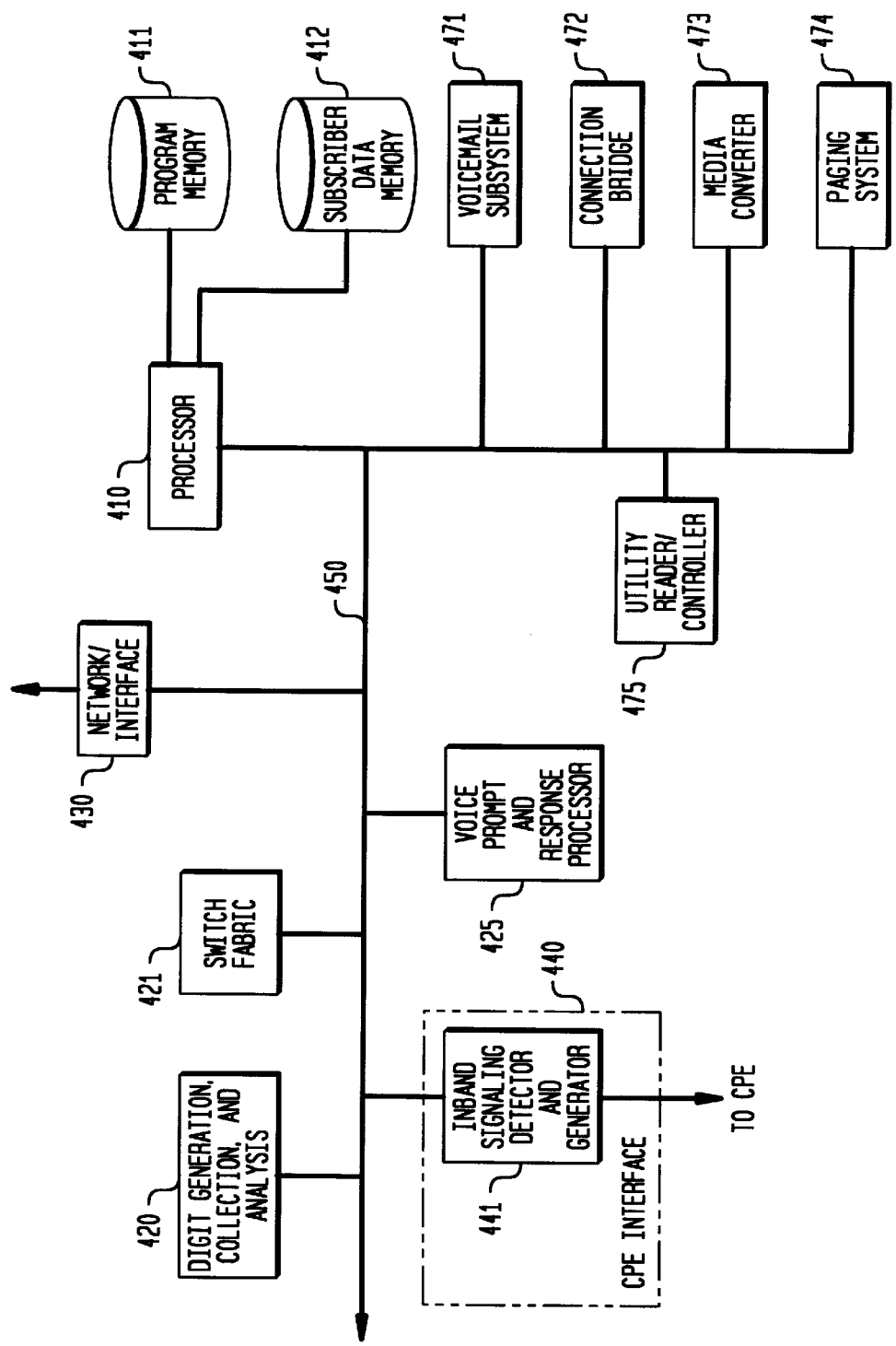
FIGS. 5 and 6 relate to providing the method and apparatus of the present invention, by way of example, at customer premises equipment at a subscriber location, be it a single customer or a business user, telephone apparatus or a private branch exchange or related customer apparatus.
Figure 6A:
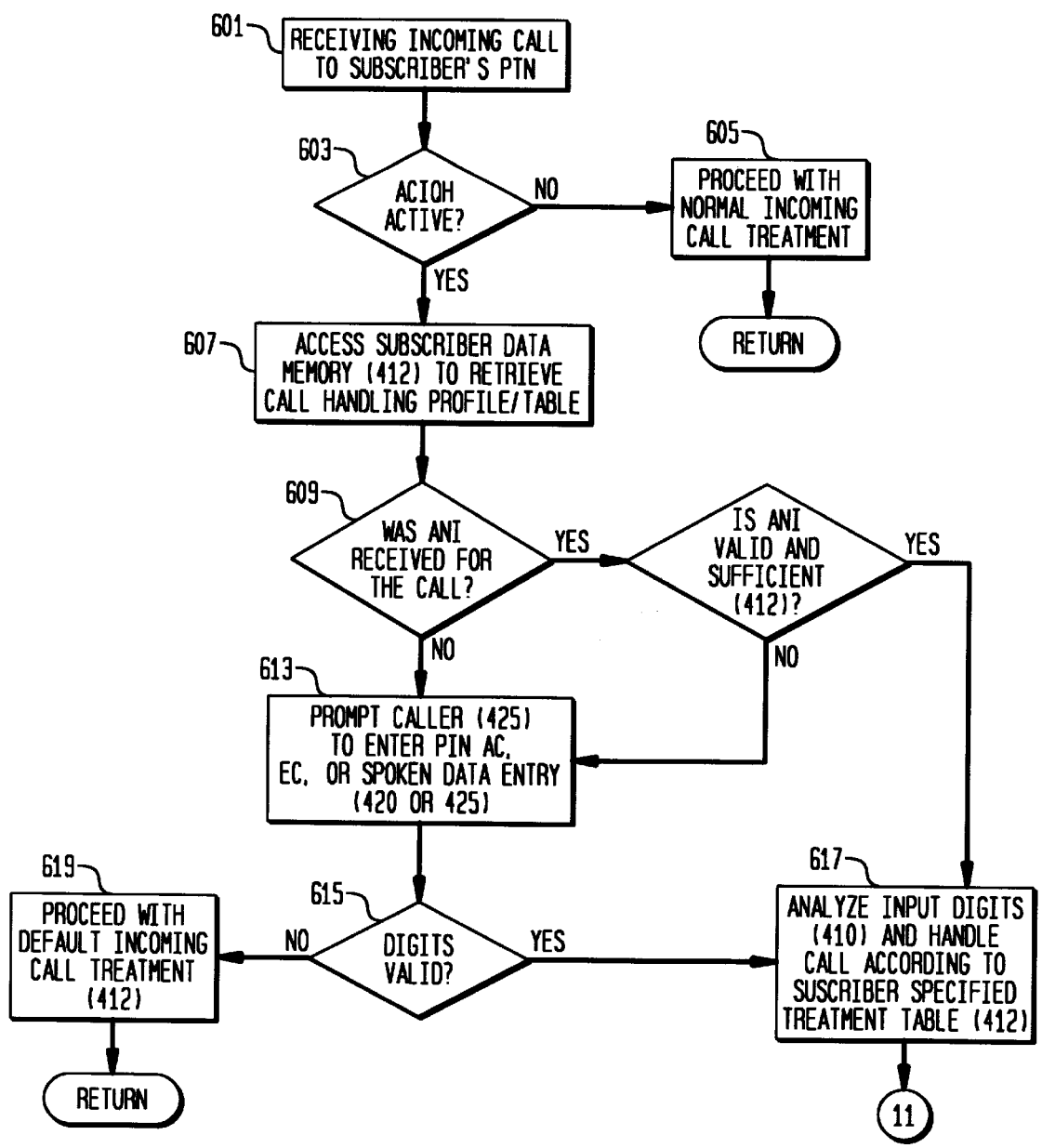

Now referring to FIG. 5 and FIGS. 6A, B and C, there is shown a customer premises embodiment of the present invention. In this embodiment, the customer's premises apparatus may comprise station equipment such as a processor-controlled terminal or linked and shared processor controlled apparatus or something more complicated such as a private banch exchange (PBX). The essential elements of the apparatus are shown in FIG. 5. And as with the discussion of FIG. 3, the reference numerals of the elements are indicated in the boxes of the flowchart of FIG. 6 that are acting at a particular point in the flowchart. Moreover, the flowchart includes numerals in circles indicating links between flowcharts as in FIGS. 3 and 4.

Referring briefly to FIG. 5, the customer premises equipment typically comprises a processor, perhaps a microprocessor, 410, having associated program memory 411 and subscriber memory 412 for storing the call treatment table of the present invention. These are coupled by a bus 450 to other elements of the equipment. Other elements may include a switch 421, digit collection and analysis 420, CPE interface 440, voice prompt unit 425 and other service circuits as identified before 471–475.

Figure 6B:
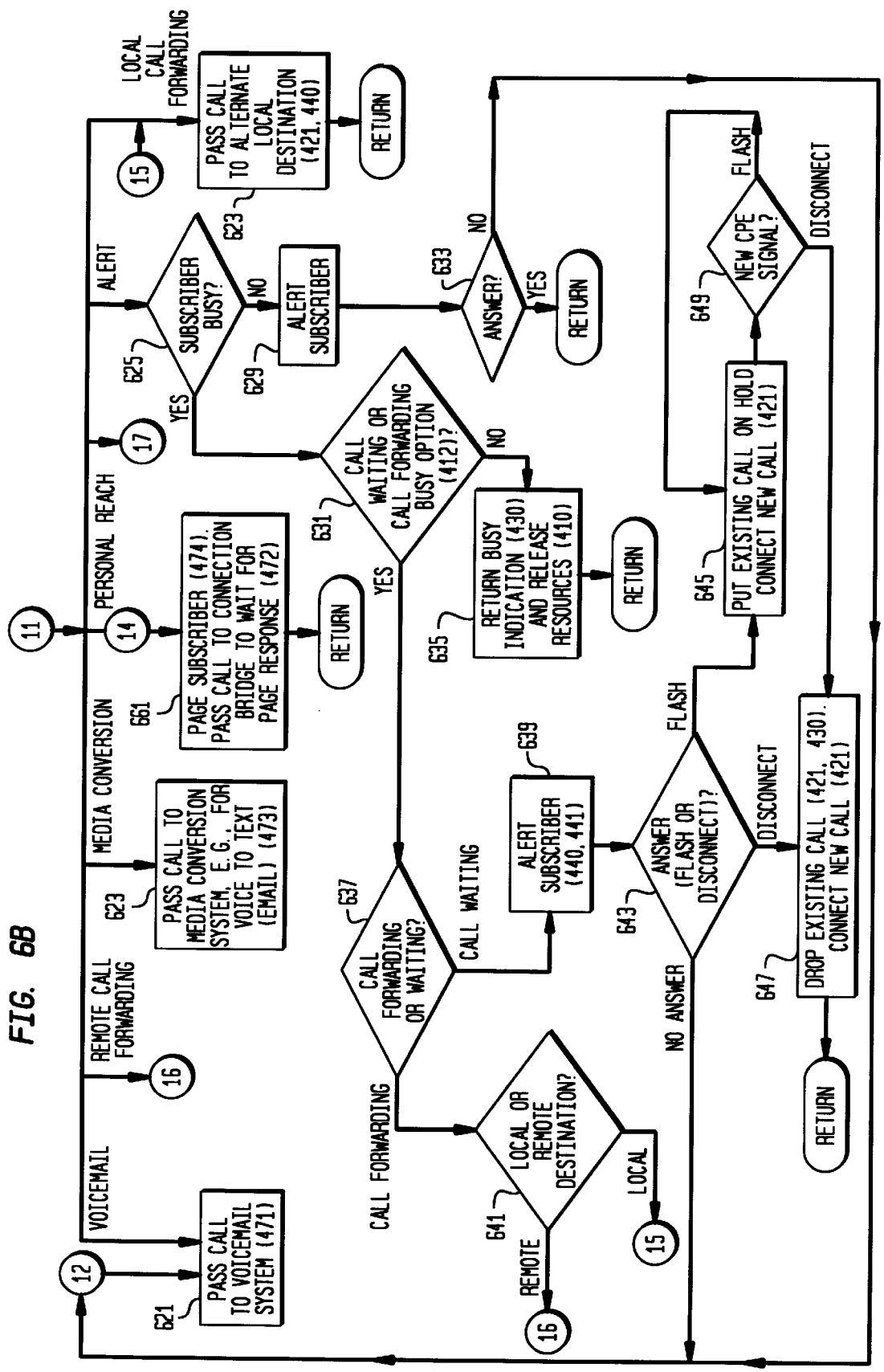
Figure 6C:
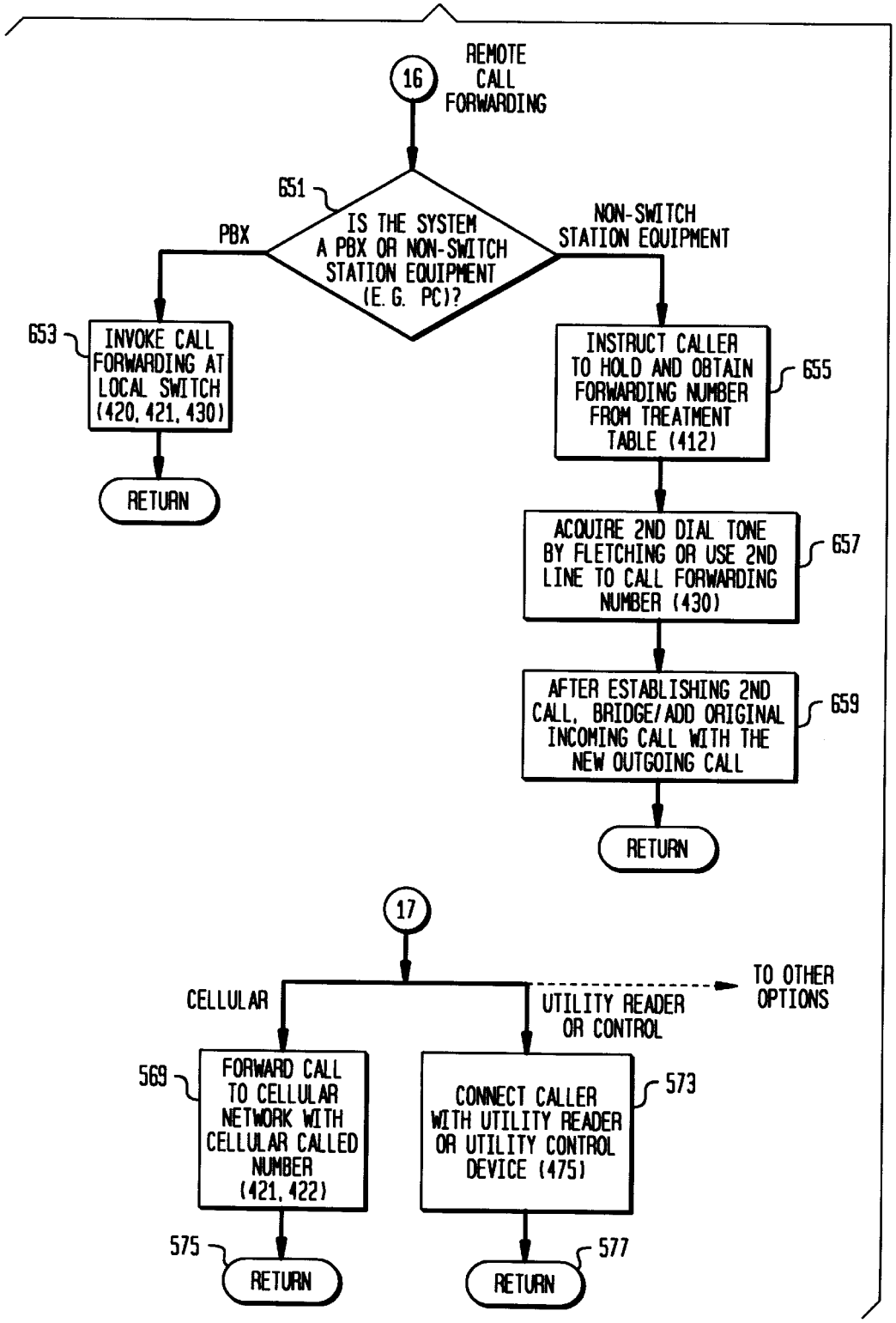

Referring to FIG. 6, the flowchart is provided for call processing via processor 410. Since its progress follows very closely the already described progress of FIG. 4, only significant differences will be now explained. The 14, 16 or 17 in a circle is intended to guide the reader from FIG. 6B to FIG. 6C. Moreover, the dashed line following 17 in FIG. 6C is intended to refer to other options not otherwise shown.

Referring first to FIG. 6B, a first difference between network equipment and station equipment or switched/non-switched CPE is the required interface between the customer's equipment and network equipment. For example, shown at the top of FIG. 6C at the top is box 651 which leads to box 653 or 655. It is important in remote call forwarding to determine whether the CPE is a PBX and/or switched station equipment or if the equipment is non-switched station equipment (CPE). If the latter, boxes 655–659 are followed. If the former, i.e. the CPE is a private branch exchange (PBX), the local (or toll) switch is invoked to perform the remote call forwarding.

Also, it is important to note that the character of the customer premises equipment performing the method of the present invention may vary from installation to installation. The equipment may be a personal computer, a cable television terminal, a cable modem, a video conference terminal, a combination of these and/or have many non-typical telecommunications functions and serve multiple purposes. The method of the present invention may be implemented at any of these or a combination of such devices as a permanently stored or loadable media including a computer program.

Thus there has been shown and described a method and apparatus for providing called party conrol of network telecommunciations services which improves upon present techniques. Many modifications to the present method may be considered implementable without undue experimentation. For example, in FIG. 4B, at box 521 or in FIG. 6B at box 625, or at any other time when it is determined that the called party is presently "busy" or involved in a call at the time a new calling party attempts to complete a call to them, the present method may further include the steps of determining the priority level of the present call and comparing that priority level with the priority level of the present calling party. Then, at either box 529 or box 631, the options available through the call treatment table may be determined from the result of that comparison. The greater the difference in priority level the greater the priority of resultant call processing. In particular, let it be assumed that the present call is from an individual known by PIN, by their calling telephone number and by their EC or emergency code while the called party is presently involved in a low priority junk-mail call. Clearly, the present calling party has a much higher priority and special actions may be taken such as call interrupt. In other words, the emergency call can interrupt the call in progress and a conference call be established for a short period permitting the called party to convince the non-emergency caller to hang up and the called party to take the emergency call. Still further modifications of the method of the present invention may become apparent from a careful reading of the specification.

All US patents referenced herein should be deemed to be incorporated by reference as to their entire contents, for example, in the event it is believed that such contents are required for a more complete understanding of the present invention. The present invention should only be deemed limited by the scope of the claims which follow.

What we claim is:

1. A method for providing called party control of telecommunications network services comprising the steps of:

storing, responsive to called party input, calling party data including an access code for determining one of three or more different classes of incoming call, and a call treatment table;

receiving an incoming call from a calling party;

prompting the calling party for calling party data including an access code identifying one of said three or more different classes of incoming call, wherein each one of said three or more different classes of incoming call receives different call treatment;

receiving calling party data including said access code entered by said calling party; and referring to said call treatment table for call treatment in accordance with said calling party data, said call treatment including at least one of media conversion and network conversion.

2. A method as recited in claim 1 further comprising the steps of;

obtaining calling party identification via at least automatic number identification; and identifying the calling party via said calling party data wherein said call treatment table includes a call treatment for each and every calling party data of said called party input or automatic number identification.

3. A method as recited in claim 2 wherein said calling party data comprises an access code representing a group of calling parties.

4. A method as recited in claim 2 wherein said calling party data comprises an emergency access code representing a high priority level of call treatment.

5. A method as recited in claim 1 further comprising the step of comparing entered calling party data to calling party data of said called party input to determine a priority level of call treatment from said call treatment table.

6. A method as recited in claim 5 further comprising the steps of:

obtaining calling party identification via at least automatic number identification; and determining if said automatic number identification is valid.

7. A method as recited in claim 1 wherein said media conversion comprises voice to text.

8. A method as recited in claim 1 wherein said media conversion comprises facsimile to voice.

9. A method as recited in claim 1 wherein said media conversion comprises the step of separating voice from a video signal.

10. A method as recited in claim 9 wherein said media conversion further comprises the step of converting said separated voice to text.

11. A method as recited in claim 9 wherein said media conversion further comprises the step of translating said separated voice from a first language to a second language.

12. A method as recited in claim 1, further comprising the step of obtaining calling party identification via at least automatic number identification, wherein said call treatment table indicates a plurality of priority levels for call treatment depending on said automatic number identification and said calling party data.

13. A method as recited in claim 12 wherein a highest level of priority corresponds to an access code comprising a prestored automatic number identification, a personal identification code and an emergency code.

14. A method as recited in claim 1 wherein said network conversion comprises public switched network to wireless network.

15. A method as recited in claim 1 wherein said network conversion comprises public switched network to Internet network.

16. A method as recited in claim 1 wherein said telecommunications network service includes home management and said method includes the additional step of entering a code to access a home management controller.

17. A method according to claim 1 wherein said step of storing calling party data includes the storing of data comprising one of a personal identification code or an access code and an emergency code.

18. A method according to claim 17 wherein said access code is different for different groups of calling parties.

19. A method according to claim 18 wherein first and second access codes for different groups have different associated priority levels for call treatment.

20. A method according to claim 12 further comprising the step of enabling the calling party to record a message in the event of a call treatment having a low priority level.

21. A method according to claim 1 comprising the step of further storing the time of day and date of the called party input storing step and updating associated stored data during the called party input step.

22. A method according to claim 1 comprising the step of further storing time of day and day of week data in said call treatment table during the called party input storing step.

23. A method according to claim 22 wherein said further call processing comprises the step of referring to current time of day and day of week and is in accordance with said call treatment table data indicating time of day and day of week and said current time of day and day of week.

24. A method for providing called party control of telecommunications network services comprising the steps of:

storing, responsive to called party input, calling party data including an access code and a call treatment table;

receiving an incoming call;

obtaining calling party identification via at least automatic number identification;

prompting a calling party for calling party data including an access code;

receiving calling party entered calling party data;

comparing said calling party entered calling party data with called party input stored calling party data to determine one of a low and a high calling party priority level;

calculating a calling party priority level from said determination;

determining if the called party is "busy" in a call;

comparing the calling party priority level with a priority level of the "busy" call; and determining the call treatment for the incoming call from the call treatment table according to the "busy" call priority level comparison.

25. A method as recited in claim 24, in the calling party data prompting step, prompting the calling party for an access code comprising a PIN and calculating the calling party priority level from the PIN and from automatic number identification.

26. A method as recited in claim 24, in the calling party data prompting step prompting the calling party for an access code comprising an emergency code and calculating the calling party priority level from the emergency code and from automatic number identification.

27. A method as recited in claim 25, in the calling party prompting step, prompting the calling party for an access code comprising a PIN and an emergency code and calculating the calling party priority level from the PIN, the emergency code and from automatic number identification.

28. A method as recited in claim 1 further comprising the steps of comparing said calling party entered access code and said called party input access code, and, if the access codes do not match, enabling the calling party to leave a message for said called party.

29. A method s recited in claim 1 further comprising the steps of comparing said calling party entered access code and said called party input access code, and, if the access codes match, connecting the calling party immediately to said called party.

30. A method as recited in claim 12 further comprising the step of obtaining a personal reach service in the event of a call treatment having a high priority level.

31. A method as recited in claim 12 further comprising the step of performing media conversion in the event of a call treatment having a high priority level.

32. A method as recited in claim 24 wherein, after said "busy" call priority level comparison step, the call treatment determination for the incoming call results in one of call forwarding and call waiting.

33. A method for providing called party control of telecommunications network services comprising the steps of:
   storing, responsive to called party input, calling party data comprising an access code associated with a calling party priority level and a call treatment table, said call treatment table associating said access code with call treatments including a call treatment for recording an incoming call and a call treatment for one of network conversion and media conversion service;
   receiving an incoming call from a calling party;
   prompting the calling party for calling party data including an access code identifying a class of incoming call;
   receiving said calling party entered access code;
   comparing said calling party entered access code with said call treatment table to determine which one of three or more different priority levels corresponds to said incoming call;
   determining a call treatment responsive to said step of comparing including one of recording said incoming call, media conversion and network conversion.

34. A method as recited in claim 33 wherein said media conversion comprises voice to text media conversion.

35. A method as recited in claim 33 wherein said network conversion comprises telephone to paging network conversion.

36. A method as recited in claim 33 wherein said media conversion comprises facsimile to voice.

37. A method as recited in claim 33 wherein said network conversion comprises telephone to Internet network conversion.

38. A method as recited in claim 33 wherein said media conversion comprises E-Mail to voice conversion.

39. A method as recited in claim 33 wherein said telecommunication network services comprise wireless telecommunications network services.

40. The method of claim 1, further comprising the step of obtaining calling party identification, where said calling party identification is used with said calling party data and said call treatment table to determine one of a low and a high priority level of call treatment and for further call processing.

41. The method of claim 40, wherein said step of obtaining calling party identification includes the step of obtaining automatic number identification for said incoming call.

42. The method of claim 1, wherein said class of incoming call is a first class of incoming call, and said first class of incoming call receives call treatment that is different from a call treatment of a second class of incoming call.

43. The method of claim 42, wherein said first class of incoming call receives call treatment that is different from both the call treatment for said second class of incoming call and a call treatment of a third class of incoming call.

44. The method of claim 42, wherein said first class of call treatment receives one of a low priority level of call treatment, a medium priority level of call treatment, and a high priority level of call treatment.

* * * * *

UNITED STATES PATENT AND TRADEMARK OFFICE
CERTIFICATE OF CORRECTION

PATENT NO.: 6,005,870

DATED: December 21, 1999

INVENTORS: Kin K. LEUNG, *et al.*

It is certified that errors appear in the above-identified patent and that said Letters Patent is hereby corrected as shown below:

In Claim 20, column 14, line 18, after "message", --for said called party-- has been inserted.

In Claim 29, column 15, line 9, "s" has been replaced by --as--.

Signed and Sealed this

Twenty-third Day of January, 2001

Attest:

Q. TODD DICKINSON

*Attesting Officer*  *Commissioner of Patents and Trademarks*